US008769870B2

(12) United States Patent
Schutter et al.

(10) Patent No.: US 8,769,870 B2
(45) Date of Patent: Jul. 8, 2014

(54) ASSEMBLY FOR DETERMINING IF HANGING PLANTS NEED TO BE WATERED

(76) Inventors: Robert Dale Schutter, Hamilton, MI (US); David Jay TerHaar, Holland, MI (US)

(*) Notice: Subject to any disclaimer, the term of this patent is extended or adjusted under 35 U.S.C. 154(b) by 188 days.

(21) Appl. No.: 13/546,284

(22) Filed: Jul. 11, 2012

(65) Prior Publication Data
US 2013/0014437 A1 Jan. 17, 2013

Related U.S. Application Data

(60) Provisional application No. 61/572,013, filed on Jul. 11, 2011.

(51) Int. Cl.
*A01G 27/00* (2006.01)

(52) U.S. Cl.
CPC .................................... *A01G 27/003* (2013.01)
USPC .................................................... 47/79; 47/67

(58) Field of Classification Search
CPC ............................. A01G 27/003; A01G 27/00
USPC ................................................ 47/66.6, 79, 67
See application file for complete search history.

(56) References Cited

U.S. PATENT DOCUMENTS

| 4,314,646 | A | * | 2/1982 | Purnell | 211/113 |
| 5,848,494 | A | * | 12/1998 | Spelt | 47/67 |
| 6,161,329 | A | * | 12/2000 | Spelt | 47/67 |
| 2004/0045218 | A1 | * | 3/2004 | Muxlow | 47/79 |
| 2009/0320363 | A1 | * | 12/2009 | Matlen | 47/65 |

FOREIGN PATENT DOCUMENTS

GB      2190573 A  * 11/1987 ............. A01G 27/00

OTHER PUBLICATIONS

ECHO Wireless Irrigation Controller Manual by Cherry Creek Systems (18 pages).
ECHO Enhanced Controller "Hook Count Application" *Infrared Photo Sensors* GCA 110 ECHO Controller Manual Version 3.5 by Cherry Creek Systems (22 pages).
ECHO Enhanced Controller "Hook Count Application" Activator Tabs, GCA 110 ECHO Controller Manual Version 3.5 by Cherry Creek Systems (21 pages).
ECHO Enhanced Controller "Continuous Run Water Mode", GCA ECHO Controller Manual Version 2A7 by Cherry Creek Systems (18 pages).
Illustrations of the ECHO system as sold by Cherry Creek Systems (18 pages).
Illustration of the MTZ hanging basket as sold by FormFlex (2 pages).

* cited by examiner

*Primary Examiner* — Kristen C Hayes
(74) *Attorney, Agent, or Firm* — Flynn, Thiel, Boutell & Tanis, P.C.

(57) ABSTRACT

A system for watering plants including a pot having a plant therein, a line carrying a hook, a watering activation switch connected to a watering system, and a pot weighing system comprising a movable arm assembly interacting with a weight switch. The pot does not move the movable arm assembly when the plant needs to be watered, whereby the movable arm assembly interacts with the weight switch to allow watering of the plant and the hook engages the plant watering activation switch to thereby activate the watering system to provide water to the plant. The pot moves the movable arm assembly when the plant does not need to be watered, whereby the movable arm assembly interacts with the weight switch to prevent activation of the watering system to prevent water from being provided to the plant.

23 Claims, 3 Drawing Sheets

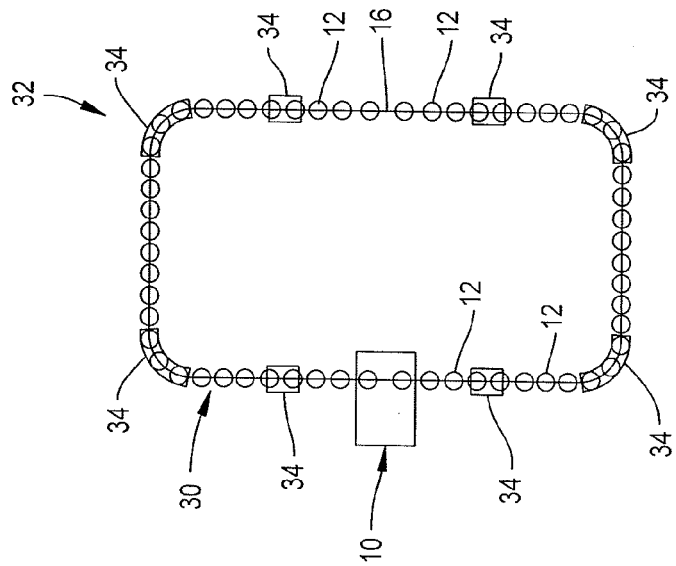
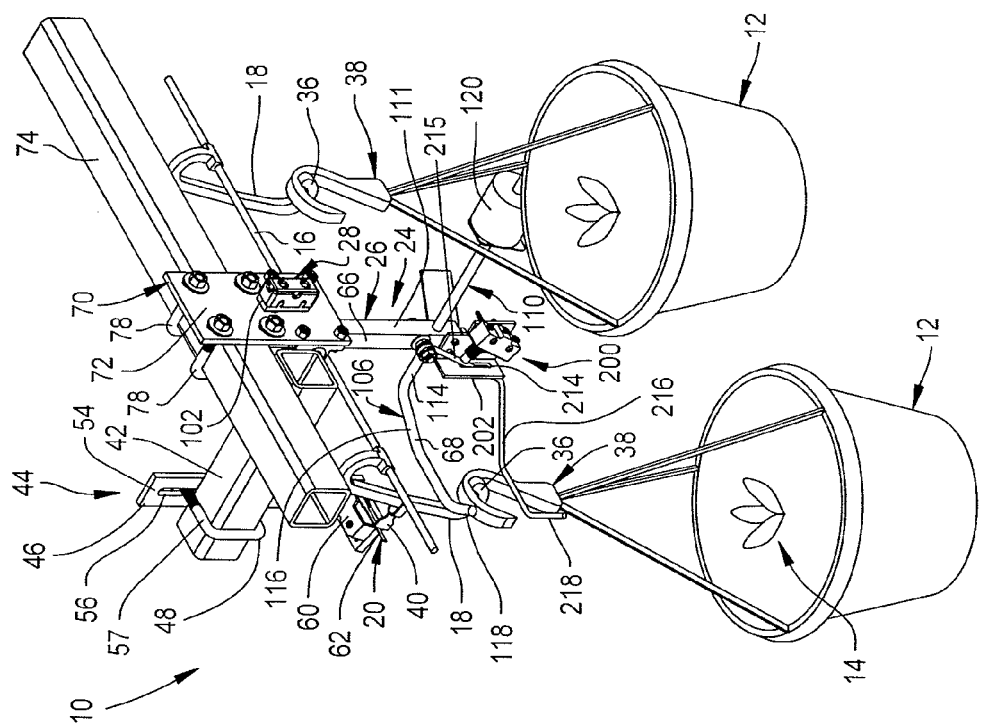
FIG. 1
FIG. 2

ASSEMBLY FOR DETERMINING IF HANGING PLANTS NEED TO BE WATERED

CROSS-REFERENCE TO RELATED APPLICATIONS

This application claims priority to co-pending U.S. Provisional Patent Application No. 61/572,013, filed Jul. 11, 2011, the disclosure of which is hereby incorporated by reference in its entirety.

FIELD OF THE INVENTION

The present invention relates to an arrangement for determining if potted plants need to be watered and for watering the potted plants as needed.

BACKGROUND OF THE INVENTION

Heretofore, systems have been employed for moving plants in pots in a greenhouse and for watering the plants as the pots move through a particular area of the greenhouse. An existing system includes having a plurality of hooks on a moving system, with each hook holding a pot. As each hook moves past the particular area of the greenhouse, the hooks abut a switch that activates a system for watering for watering the plants. However, each hook that passes the particular area will activate the switch, whether the plant needs water and even when there is no pot on the hook. A better and easier system for watering plants is desired.

SUMMARY OF THE INVENTION

In view of the above, one object of the invention is to provide a system that determines if a plant in a pot needs to be watered, and watering the plant if the plant does need the water.

In this regard, the present invention includes a system for watering plants comprising a pot having a plant therein, a line carrying a hook thereon, with the hook carrying the pot, a plant watering activation switch connected to a watering system configured to provide water to the plant in the pot, and a pot weighing system comprising a movable arm assembly configured to interact with a weight switch. The line carries the pot along a path between the plant watering activation switch and the movable arm assembly of the pot weighing system. The pot does not move the movable arm assembly of the pot weighing system when the plant in the pot needs to be watered, whereby the movable arm assembly interacts with the weight switch to allow watering of the plant in the pot and the hook engages the plant watering activation switch to thereby activate the watering system to provide water to the plant in the pot. The pot moves the movable arm assembly of the pot weighing system when the plant in the pot does not need to be watered, whereby the movable arm assembly interacts with the weight switch to prevent activation of the watering system to prevent water from being provided to the plant in the pot.

BRIEF DESCRIPTION OF THE DRAWINGS

FIG. 1 is a perspective view of a system for watering plants of the present invention.
FIG. 2 is a top schematic view of a greenhouse using the system for watering plants of the present invention.

DETAILED DESCRIPTION

Figure 4:
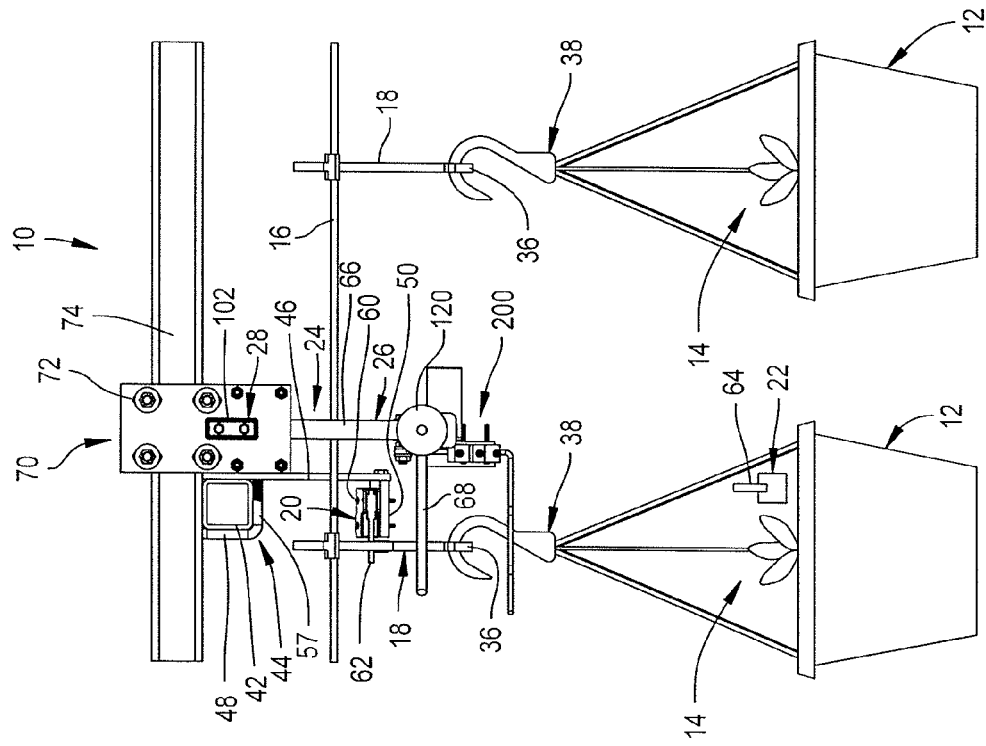
FIG. 4 is a side view of the system for watering plants of the present invention.

For purposes of description herein, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined herein. Hence, specific dimensions and other physical characteristics relating to the embodiments disclosed herein are not to be considered as limiting, unless expressly stated otherwise.

The reference number 10 (FIGS. 1-5) generally designates a system for watering plants embodying the present invention. In the illustrated example, the system 10 comprises a pot 12 having a plant 14 therein and a line 16 carrying a hook 18 thereon, with the hook 18 carrying the pot 12. A plant watering activation switch 20 is connected to a watering system 22 configured to provide water to the plant 14 in the pot 12. A pot weighing system 24 comprising a movable arm assembly 26 is configured to interact with a weight switch 28. The line 16 carries the pot 12 along a path 30 between the plant watering activation switch 20 and the movable arm assembly 26 of the pot weighing system 24. The pot 12 does not move the movable arm assembly 26 of the pot weighing system 24 when the plant 14 in the pot 12 needs to be watered, whereby the movable arm assembly 26 interacts with the weight switch 28 to allow watering of the plant 14 in the pot 12 and the hook 18 engages the plant watering activation switch 20 to thereby activate the watering system 22 to provide water to the plant 14 in the pot 12. The pot 12 moves the movable arm assembly 26 of the pot weighing system 24 when the plant 14 in the pot 12 does not need to be watered, whereby the movable arm assembly 26 interacts with the weight switch 28 to prevent activation of the watering system 22 to prevent water from being provided to the plant 14 in the pot 12.

The illustrated system 10 for watering plants 14 can be used in a greenhouse 32 or other location for holding a plurality of plants 14 in pots 12. FIG. 2 illustrates a schematic greenhouse 32 including the plurality of plants 14 in pots 12. The pots 12 are hung from the line 16. The line 16 can be linear and/or curved and can form an endless loop. The line 16 can also be flexible, inflexible or formed from a plurality of inflexible links. In FIG. 2, the line 16 forms an endless loop and the greenhouse 32 includes a plurality of supports and/or movers 34 for supporting and/or moving the line 16 to move the pots 12 along the path 30 and through the system 10 for watering plants 14. Such supports and/or movers 34 are well known to those skilled in the art. It is contemplated that the supports and/or movers 34 can move the line 16 and therefor the pots 12 with the plants 14 therein slowly through the system 10 for watering plants 14 to allow for each of the plants 14 to be watered using the watering system 22 or can periodically stop when each pot 12 is adjacent the watering system 22.

In the illustrated example, the hook 18 activates the plant watering activation switch 20 to activate the watering system 22 to water the plant 14 in the pot 12. The hook 18 is substantially C-shaped and includes a top end fixed to the line 16 and a bottom hook portion 36 holding a hanger 38 of the pot 12. While all of the hooks 18 in the present application are illustrated as being identical in length, it is contemplated that the hooks 18 can comprise a series of alternating long and short hooks 18 to allow the pots 12 to be located near each other in a vertically staggered fashion. It is further contemplated that the hangers 38 could be alternating long and short to allow pots 12 to be located next to each other in the vertically staggered fashion. Each of the hooks 18 includes an activation member 40 extending laterally from a center portion thereof. The activation member 40 is configured to abut the plant watering activation switch 20 to water the plant 14 in the pot 12 as the line 16 moves the pot 12 with the plant 14 therein past the watering system 22.

The illustrated plant watering activation switch 20 interacts with the watering system 22 to activate the watering system 22. The plant watering activation switch 20 is connected to a first tube 42 of the greenhouse 32 via a switch mounting assembly 44. The switch mounting assembly 44 includes a switch hanger bracket 46, a U-bolt 48, a switch mounting plate 50 and a plurality of fasteners 52. The switch hanger bracket 46 comprises a plate 54 having a pair of elongated vertically extending openings 56 therein. The U-bolt 48 surrounds the first tube 42, and top and bottom arms 57 of the U-bolt 48 extend through the pair of elongated vertically extending openings 56 to connect the switch hanger bracket 46 to the first tube 42. The elongated vertically extending openings 56 allow the U-bolt 48 to slide vertically therethrough to allow the switch hanger bracket 46 to be vertically adjusted relative to the first tube 42 as needed. One of the fasteners 52 extends through an opening 58 adjacent a bottom of the plate 54 of the switch hanger bracket 46 and into a side face of the switch mounting plate 50 to connect the switch mounting plate 50 to the switch hanger bracket 46. The switch mounting plate 50 can be rotated about the fastener 52 to adjust an angle of the switch mounting plate 50. The plant watering activation switch 20 is connected to a top of the switch mounting plate 50. It is contemplated that the switch mounting plate 50 could be connected to the first tube 42 or any other appropriate portion of the greenhouse 32 in any manner using any structure. It is further contemplated that the plant watering activation switch 20 and the switch mounting plate 50 could be pivotally connected to the switch hanger bracket 46 or any other appropriate portion of the greenhouse 32 in any manner.

In the illustrated example, the watering system 22 provides water to the pot 12 when the plant watering activation switch 20 is activated and when the plant 14 in the pot 12 needs to be watered. The plant watering activation switch 20 includes a switch housing 60 connected to the switch mounting plate 50 and a horizontal extending switch arm 62. The switch arm 62 extending is a direction substantially parallel to the direction of travel of the line 16. The switch arm 62 includes a pivot side pivotally connected to the switch housing 60 and an opposite free side. The free side of the switch arm 62 is located before the pivot side along a line parallel and in the same direction as the direction of travel of the line 16. As the hook 18 passes by the plant watering activation switch 20, the activation member 40 extending therefrom abuts the free side of the switch arm 62 to pivot the switch arm 62 about the pivot side of the switch arm 62 to activate the plant watering activation switch 20. If the plant 14 in the pot 12 needs to be watered, water will exit from a spigot 64 of the watering system 22 when the activation member 40 of the hook 18 pivots the switch arm 62 to activate the plant watering activation switch 20. The plant watering activation switch 20 can turn on the spigot 64 to expel water therefrom using any valve system and valve control system.

The illustrated pot weighing system 24 determines if the plant 14 in the pot 12 needs to be watered. The pot weighing system 24 includes the movable arm assembly 26 and the weight switch 28. The movable arm assembly 26 is connected to the structure of the greenhouse 32 via a pivot assembly 70. The pivot assembly 70 includes a back plate 72 connected to a second tube 74 of the structure of the greenhouse 32 and a pair of bearing plates 76. The back plate 72 is connected to the second tube 74 by a pair of U-bolts 78. The back plate 72 has two pairs of aligned elongated vertically extending openings 80 therein. The U-bolts 78 surround the second tube 74, and top and bottom arms 82 of the U-bolts 78 extend through the pairs of elongated vertically extending openings 80 to connect the back plate 72 to the second tube 74. The elongated vertically extending openings 80 allow the U-bolts 78 to slide vertically therethrough to allow the back plate 72 to be vertically adjusted relative to the second tube 74 as needed. The weight switch 28 includes a base 102 connected to the back plate 72 and a plunger switch 100 extending therefrom and into an aperture 104 in the back plate 72. The bearing plates 76 each include a base 84 connected to the back plate 72 by fasteners 86 and an opening 88. The openings 88 of the bearing plates 76 are cylindrical and have co-linear axes. The movable arm assembly 26 is connected to the bearing plates 76.

In the illustrated example, the movable arm assembly 26 comprises a hanging pivot arm 66 and a balance bar 68. The hanging pivot arm 66 includes a pivot shaft 90 connected to a vertically extending tube 92 adjacent a top end thereof. The pivot shaft 90 includes a centrally enlarged tubular portion 94 connected to the vertically extending tube 92 and a pair of aligned pins 96 extending collinearly from the centrally enlarged tubular portion 94. The pair of aligned pins 96 of the pivot shaft 90 extend into the openings 88 in the baring plates 76 to allow the pivot shaft 90 and the vertically extending tube 92 to pivot relative to the bearing plates 76 and the back plate 72 about an axis of rotation. An actuation pin 98 extends through the vertically extending tube 92 at the top end thereof. The actuation pin 98 is configured to selectively depress and interact with the plunger switch 100 of the weight switch 28 as discussed in more detail below.

Figure 3:
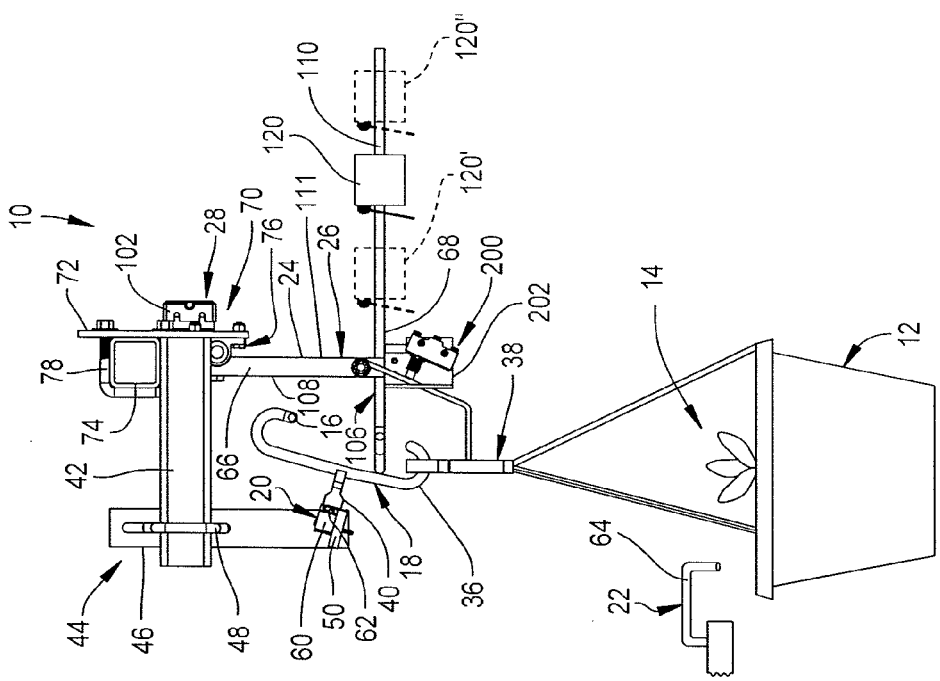
FIG. 3 is a front view of the system for watering plants of the present invention.
Figure 5:
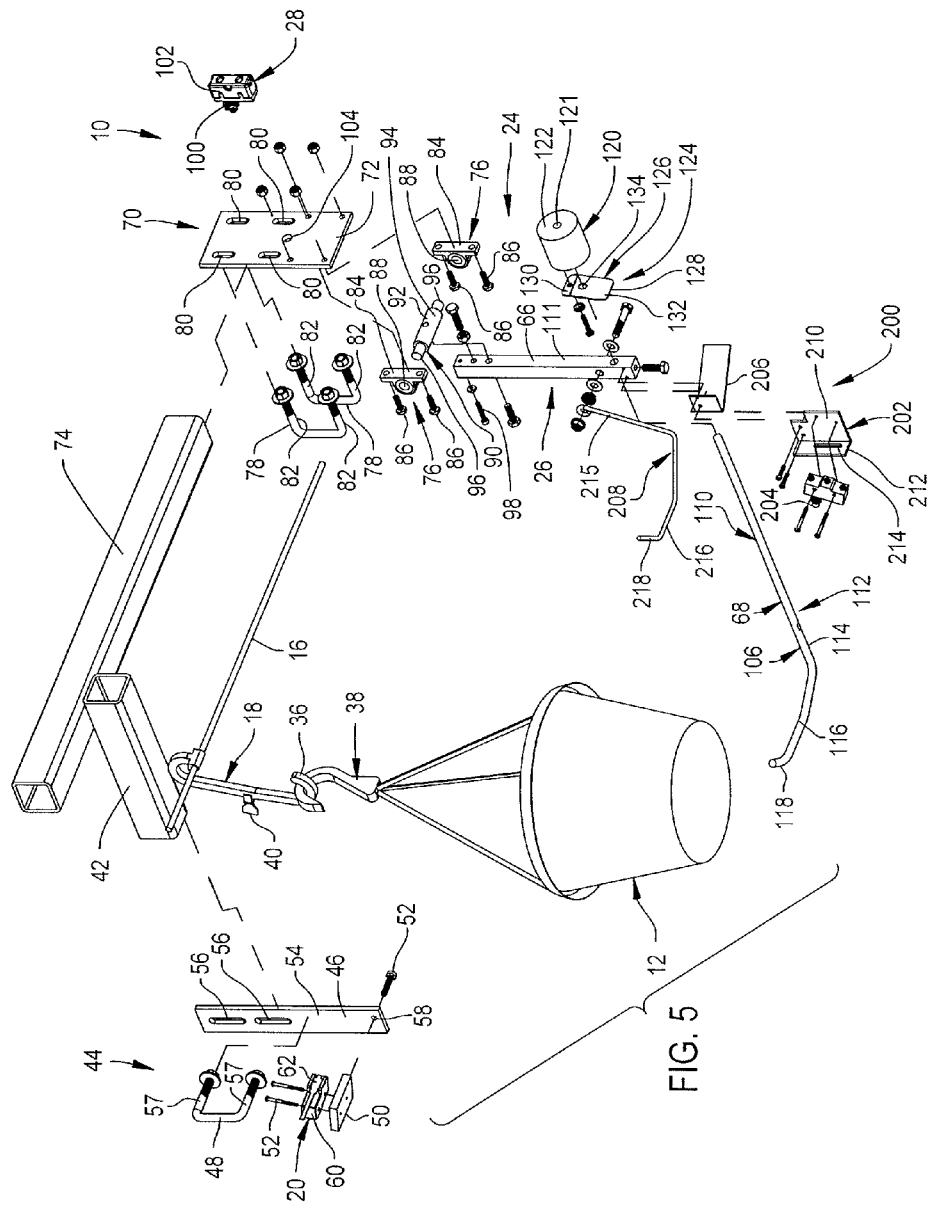
FIG. 5 is an exploded perspective view of the system for watering plants of the present invention.

The illustrated balance bar 68 is connected to the hanging pivot arm 66. As illustrated in FIG. 3, the balance bar 68 includes a first extension 106 extending from a first side 108 of the hanging pivot arm 66 and a second extension 110 extending from a second opposite side 111 of the hanging pivot arm 66. The first extension 106 is cantilevered from first side 108 of the hanging pivot arm 66 to supply a counterclockwise moment about the pivot shaft 90 as viewed in FIG. 3 and the second extension 110 is cantilevered from the second side 111 of the hanging pivot arm 66 to supply a clockwise moment about the pivot shaft 90 as viewed in FIG. 3. While the first extension 106 and the second extension 110 can be located anywhere vertically on the hanging pivot arm 66, in the illustrated embodiment, the first extension 106 and the second extension 110 are ends of a rod 112 extending through the hanging pivot arm 66. However, it is contemplated that the first extension 106 and the second extension 110 could be separate members.

In the illustrated example, the first extension 106 of the balance bar 68 is configured to abut against the hook 18 as the hook 18 passes through the system 10 for watering plants. The first extension 106 includes a proximal portion 114 extending from the first side 108 of the hanging pivot arm 66, an intermediate portion 116 extending substantially parallel to the direction of travel of the line 16 and a distal angled portion 118 angled away from the direction of travel of the line 16. As the hooks 18 and the pots 12 enter the system 10 for watering plants, the hooks 18 will engage an outside face of the distal angled portion 118 and then run against the outside face of the intermediate portion 116 of the first extension 106 of the balance bar 68.

The illustrated second extension 110 of the balance bar 68 extends from the hanging pivot arm 66 in a direction substantially opposite to the direction that the first extension 106 of the balance bar 68 extends from the hanging pivot arm 66. The second extension 110 includes a movable counter balance weight 120 thereon. The movable counter balance weight 120 includes a cylindrical body 122 having a center opening 121 to allow the movable counter balance weight 120 to slide on the second extension 110 toward and away from the hanging pivot arm 66. As the movable counter balance weight 120 moves toward the hanging pivot arm 66, the moment of the movable arm assembly 26 about the pivot shaft 90 decreases. Likewise, as the movable counter balance weight 120 moves away from the hanging pivot arm 66, the moment of the movable arm assembly 26 about the pivot shaft 90 increases.

In the illustrated example, the movable counter balance weight 120 can include a lock system 124 for fixing a position of the movable counter balance weight 120 on the second extension 110 of the balance bar 68. For example, the lock system 124 can comprise a lock brake 126 connected to the movable counter balance weight 120. The lock brake 126 can be a bent plate 128 having a first portion 130 connected to an end of the movable counter balance weight 120 and a second portion 132 extending away from the movable counter balance weight 120. The second portion 132 can include an opening 134 therein for accepting the second extension 110 of the balance bar 68. When the second portion 132 of the bent plate 128 of the lock brake 126 is moved toward the movable counter balance weight 120, the opening 134 therein is aligned with the center opening 121 in the cylindrical body 122 of the movable counter balance weight 120, thereby allowing the cylindrical body 122 of the movable counter balance weight 120 to easily move along the second extension 110 of the balance bar 68 therethrough. However, when the second portion 132 of the bent plate 128 of the lock brake 126 is released, the resiliency of the bent plate 128 of the lock brake 126 will move the second portion 132 of the bent plate 128 away from the cylindrical body 122 of the movable counter balance weight 120, thereby misaligning the opening 134 in the second portion 132 of the bent plate 128 with the center opening 121 in the cylindrical body 122 of the movable counter balance weight 120 to prevent the movable counter balance weight 120 from sliding on the second extension 110 of the balance bar 68 (as the bottom edge of the opening 134 in the second portion 132 of the bent plate 128 is forced against the second extension 110 of the balance bar 68 to prevent movement via friction). It is contemplated that the movable counter balance weight 120 could take other forms (e.g., a weight screwed over or into an end of the second extension 110 of the balance bar 68).

The weight of the pot 12 determines if the plant 14 is to be watered. If the plant 14 in the pot 12 has enough water, the plant 14 in the pot 12 will weigh more than a plant 14 in a pot 12 that needs water. If the plant 14 in the pot 12 does not need to be watered, the weight of the plant 14 and the pot 12 will pull the hook 18 downward such that the hook 18 will push against the distal angled portion 118 and the intermediate portion 116 of the first extension 106 of the balance bar 68, thereby causing the movable arm assembly 26 to rotate counterclockwise as viewed in FIG. 3. As the movable arm assembly 26 moves counterclockwise, the actuation pin 98 extending through the vertically extending tube 92 of the movable arm assembly 26 interacts with the plunger switch 100 of the weight switch 28 by releasing the plunger switch 100. If the plunger switch 100 is not depressed, a circuit including the watering activation switch 20 is open to prevent watering of the plant in the pot. It is contemplated that the weight switch 28 could comprise a circuit that needs to be closed along with the watering activation switch 20 comprising a separate circuit that needs to be closed in order to water the plant 14. It is also contemplated that the weight switch 28 and the watering activation switch 20 could comprise any control system that, when the weight switch 28 and/or the watering activation switch 20 are activated or depressed, tells the system to water the plant 14. It is also contemplated that the plunger switch 100 of the weight switch 28 would be of the opposite side of the top of the vertically extending tube 92 such that depressing the plunger switch 100 tells the system to not water the plant 14.

If the plant 14 in the pot 12 needs to be watered, the weight of the plant 14 and the pot 12 will pull the hook 18 downward and push against the distal angled portion 118 and the intermediate portion 116 of the first extension 106 of the balance bar 68. However, the weight of the plant 14 and the pot 12 that needs to be watered does not weigh enough to cause the movable arm assembly 26 to rotate counterclockwise as viewed in FIG. 3. Therefore, the actuation pin 98 extending through the vertically extending tube 92 of the movable arm assembly 26 interacts with the plunger switch 100 of the weight switch 28 by depressing the plunger switch 100 (or maintaining the plunger switch 100 depressed). If the plunger switch 100 is depressed, a circuit including the watering activation switch 20 is closed to allow watering of the plant 14 in the pot 12 when the watering activation switch 20 is activated. It is contemplated that the weight switch 28 could comprise a circuit that needs to be open along with the watering activation switch 20 comprising a separate circuit that needs to be closed in order to water the plant 14. It is also contemplated that the weight switch 28 and the watering activation switch 20 could comprise any system that, when activated or depressed, tells the system to water the plant 14.

The system for watering plants 10 can be adjusted by altering the position of the movable counter balance weight 120 relative to the hanging pivot arm 66. As the movable counter balance weight 120 moves toward the hanging pivot arm 66 (shown as movable counter balance weight 120' in FIG. 3), it takes less weight of the plant 14 in the pot 12 to move the movable arm assembly 26. Conversely, as the movable counter balance weight 120 moves away from the hanging pivot arm 66 (shown as movable counter balance weight 120" in FIG. 3), it takes more weight of the plant 14 in the pot 12 to move the movable arm assembly 26. The movable counter balance weight 120 can therefore be moved to adjust for the desired weight of the plant 14 in the pot 12 to determine if the plant 14 should or should not be watered. The movable counter balance weight 120 can also be adjusted to account for different plants 14 on the line 16.

In the illustrated example, the system for watering plants 10 can include an empty hook detection system 200 for preventing activation of the system 10 for watering plants when there is no pot 12 on a particular hook 18. The empty hook detection system 200 includes an empty hook switch bracket 202, a plunger switch 204, an empty hook deflector 206 and an empty hook switch lever 208. The empty hook switch bracket 202 is L-shaped and includes a first portion 210 connected to a bottom of the hanging pivot arm 66 of the movable arm assembly 26 and a substantially perpendicular second portion 212. The second portion 212 includes a vertically elongated slot 214 therethrough. The empty hook switch lever 208 extends through the vertically elongated slot 214. The empty hook switch lever 208 includes a first vertically angled portion 215 pivotally connected to the hanging pivot arm 66 of the movable arm assembly 26 above the empty hook switch bracket 202 and extending through the vertically elongated slot 214 of the second portion 212 of the empty hook switch bracket 202, a intermediate portion 216 extending substantially parallel to the direction of travel of the line 16, and a distal angled portion 218 angled away from the direction of travel of the line 16. The plunger switch 204 is connected to the first portion of the empty hook switch bracket 202 and abuts against the first vertically angled portion 215. The plunger switch 204 is spring or other biasing member deactivated (such that the bias of the spring or other biasing member must be overcome to activate the plunger switch 204).

In the illustrated example, if the hook 18 has a pot 12 thereon, the hanger 38 of the pot 12 will abut the distal angled portion 218 and the intermediate portion 216 of the empty hook switch lever 208 as the pot 12 moves through the system 10. The weight of the hanger 38 will force the empty hook switch lever 208 to move against the bias of the plunger switch 204 to depress the plunger switch 204. If the plunger switch 204 is depressed, a circuit including the watering activation switch 20 is closed to allow watering of the plant 14 in the pot 12. It is contemplated that the plunger switch 204, the weight switch 28 and the watering activation switch 20 all comprise separate circuits that need to be closed in order to water the plant 14. It is also contemplated that the plunger switch 204 could comprise any control system that, when the plunger switch 204 is activated or depressed, allows the system 10 to water the plant 14. If the hook 18 does not have a pot 12 thereon, the empty hook switch lever 208 is not moved and the plunger switch 204 is not depressed, thereby preventing the system 10 from watering (as the absence of a pot 12 would result in the movable arm assembly 26 not moving, but one would not want the watering system 22 to activate where there is no pot 12 traveling through the system 10). The empty hook deflector 206 is a bent plate that pushes the empty hooks 18 past the movable arm assembly 26.

Although particular preferred embodiments of the invention have been disclosed in detail for illustrative purposes. For example, it is contemplated that the movable arm assembly 26 could comprise a stationary vertical arm (or no vertical arm at all) and the balance bar could interact with an adjustable spring such that movement of the balance bar as outlined above by the weight of the plant in the pot would push the balance bar linearly against the bias of the adjustable spring (instead of rotating the balance bar), whereby the linearly moving balance bar interacts with the weight switch. It will be recognized that variations or modifications of the disclosed apparatus, including the rearrangement of parts, lie within the scope of the present invention.

What is claimed is:

1. A system for watering plants comprising:
a pot having a plant therein;
a line carrying a hook thereon, the hook carrying the pot;
a plant watering activation switch connected to a watering system configured to provide water to the plant in the pot; and
a pot weighing system comprising a movable arm assembly configured to interact with a weight switch;
the line carrying the pot along a path between the plant watering activation switch and the movable arm assembly of the pot weighing system;
the pot not moving the movable arm assembly of the pot weighing system when the plant in the pot needs to be watered, whereby the movable arm assembly interacts with the weight switch to allow watering of the plant in the pot and the hook engages the plant watering activation switch to thereby activate the watering system to provide water to the plant in the pot;
the pot moving the movable arm assembly of the pot weighing system when the plant in the pot does not need to be watered, whereby the movable arm assembly interacts with the weight switch to prevent activation of the watering system to prevent water from being provided to the plant in the pot.

2. The system for watering plants of claim 1, wherein:
the movable arm assembly comprises:
a hanging pivot arm hanging from a structure and pivoting relative thereto about a horizontal axis; and
a balance bar connected to the hanging pivot arm at a location distal the structure, the balance bar having an abutment arm on a first side of the hanging pivot arm and a movable weight on a second side of the hanging pivot arm.

3. The system for watering plants of claim 2, wherein:
the movable arm assembly includes a movable weight lock device for locking the movable weight in a selected position on the balance bar.

4. The system for watering plants of claim 2, wherein:
the hook abuts the balance bar to move the movable arm assembly.

5. The system for watering plants of claim 4, wherein:
a top portion of the hanging pivot arm abuts the weight switch to interact the movable arm assembly with the weight switch.

6. The system for watering plants of claim 2, further including:
an empty hook detection system for preventing activation of the watering system, the empty hook detection system including a movable bar and an empty hook detection switch;
the plant moving the movable bar of the empty hook detection system when the hook carries the plant in the pot, whereby the movable bar interacts with the empty hook detection switch to allow watering of the plant in the pot.

7. The system for watering plants of claim 6, wherein:
the empty hook detection system is on the hanging pivot arm.

8. The system for watering plants of claim 1, further including:
an empty hook detection system for preventing activation of the watering system, the empty hook detection system including a movable bar and an empty hook detection switch;
the plant moving the movable bar of the empty hook detection system when the hook carries the plant in the pot, whereby the movable bar interacts with the empty hook detection switch to allow watering of the plant in the pot.

9. A pot weighing system for determining if a plant in a pot within a structure needs to be watered, the pot weighing system comprising:
a hanging pivot arm configured to hang from the structure and pivot relative thereto about a horizontal axis;
a balance bar connected to the hanging pivot arm at a location configured to be distal the structure, the balance bar having an abutment arm on a first side of the hanging pivot arm and a movable weight on a second side of the hanging pivot arm; and
a weight switch for preventing water from being delivered to the plant in the pot;
the hanging pivot arm being moved to interact with the weight switch;

the hanging pivot arm pivoting when the plant in the pot does not need to be watered, to thereby interact with the weight switch to prevent the plant from being watered;

the hanging pivot arm not pivoting when the plant in the pot needs to be watered to thereby interact with the weight switch to allow the plant from being watered.

10. The pot weighing system of claim 9, wherein:

the movable arm assembly includes a movable weight lock device for locking the movable weight in a selected position on the balance bar.

11. The pot weighing system of claim 10, wherein:

a top portion of the hanging pivot arm abuts the weight switch to interact the hanging pivot arm with the weight switch.

12. The pot weighing system of claim 10, further including:

an empty hook detection system for preventing activation of a watering system, the empty hook detection system including a movable bar and an empty hook detection switch;

the movable bar being configured to be moved by a hook carrying the plant, whereby the movable bar interacts with the empty hook detection switch to allow watering of the plant in the pot.

13. The pot weighing system of claim 12, wherein:

the empty hook detection system is on a lower portion of the hanging pivot arm.

14. The pot weighing system of claim 9, further including:

an empty hook detection system for preventing activation of a watering system, the empty hook detection system including a movable bar and an empty hook detection switch;

the movable bar being configured to be moved by a hook carrying the plant, whereby the movable bar interacts with the empty hook detection switch to allow watering of the plant in the pot.

15. A method of watering plants comprising:

providing a pot having a plant therein;

providing a line carrying a hook thereon;

carrying the pot with the hook;

connecting a plant watering activation switch to a watering system configured to provide water to the plant in the pot;

providing a pot weighing system comprising a movable arm assembly configured to interact with a weight switch;

carrying the pot with the line along a path between the plant watering activation switch and the movable arm assembly of the pot weighing system;

not moving the movable arm assembly of the pot weighing system when the plant in the pot needs to be watered, with the movable arm assembly interacting with the weight switch and watering the plant in the pot with the watering system when the hook engages the plant watering activation switch;

moving the movable arm assembly of the pot weighing system with the pot when the plant in the pot does not need to be watered, with the movable arm assembly interacting with the weight switch to prevent activation of the watering system to prevent water from being provided to the plant in the pot.

16. The method of watering plants of claim 15, wherein:

the movable arm assembly comprises a hanging pivot arm and a balance bar;

and further including:

hanging the hanging pivot arm from a structure;

pivoting the hanging pivot arm about a horizontal axis;

connecting the balance bar to the hanging pivot arm at a location distal the structure, the balance bar having an abutment arm on a first side of the hanging pivot arm and a movable weight on a second side of the hanging pivot arm.

17. The method of watering plants of claim 16, further including:

moving the movable weight along the balance bar to alter the weight of the plant in the pot needed to activate the weight switch.

18. The method of watering plants of claim 16, wherein:

locking the movable weight in a selected position on the balance bar with a movable weight lock device.

19. The method of watering plants of claim 16, further including:

abutting the balance bar with the hook to move the movable arm assembly.

20. The method of watering plants of claim 19, wherein:

interacting the movable arm assembly with the weight switch by abutting a top portion of the hanging pivot arm with the weight switch.

21. The method of watering plants of claim 16, further including:

preventing activation of the watering system with an empty hook detection system, the empty hook detection system including a movable bar and an empty hook detection switch;

moving the movable bar of the empty hook detection system with the plant when the hook carries the plant in the pot, whereby the movable bar interacts with the empty hook detection switch to allow watering of the plant in the pot.

22. The method of watering plants of claim 21, wherein:

the empty hook detection system is on the hanging pivot arm.

23. The method of watering plants of claim 15, further including:

preventing activation of the watering system with an empty hook detection system, the empty hook detection system including a movable bar and an empty hook detection switch;

moving the movable bar of the empty hook detection system with the plant when the hook carries the plant in the pot, whereby the movable bar interacts with the empty hook detection switch to allow watering of the plant in the pot.

\* \* \* \* \*